United States Patent [19]
Nikolayczik

[11] Patent Number: 5,332,003
[45] Date of Patent: Jul. 26, 1994

[54] SANITARY WATER VALVE

[75] Inventor: Hans Nikolayczik, Minheim, Fed. Rep. of Germany

[73] Assignee: Ideal Standard GmbH, Bonn, Fed. Rep. of Germany

[21] Appl. No.: 988,941

[22] PCT Filed: Jun. 25, 1991

[86] PCT No.: PCT/EP91/01183
§ 371 Date: Feb. 25, 1993
§ 102(e) Date: Feb. 25, 1993

[87] PCT Pub. No.: WO92/04570
PCT Pub. Date: Mar. 19, 1992

[30] Foreign Application Priority Data
Aug. 31, 1990 [AT] Austria .................. 1787/90

[51] Int. Cl.⁵ .............................. F16K 47/02
[52] U.S. Cl. ................. 137/625.17; 251/127
[58] Field of Search ............ 137/625.17; 251/127

[56] References Cited
U.S. PATENT DOCUMENTS

| 3,433,264 | 3/1969 | Parkison | 251/127 X |
| 4,218,041 | 8/1980 | Bernat | 251/127 |
| 4,362,186 | 12/1982 | Parkison | 137/625.17 |
| 4,854,347 | 8/1989 | Knapp | 137/625.17 X |

Primary Examiner—Robert G. Nilson
Attorney, Agent, or Firm—Herbert Dubno; Andrew Wilford

[57] ABSTRACT

A valve has a housing provided with a fixed inlet disk in the housing formed with throughgoing water-inlet ports and a fixed outlet disk transversely spaced in the housing from the inlet disk and formed with deflecting chambers aligned transversely with the inlet ports. A movable valve disk in the housing between the fixed disks is formed with throughgoing passages alignable transversely between the respective inlet ports and deflecting chambers and has a side forming with the housing an outlet recess. Toothed steps are formed on the side of the movable valve disk to reduce noise.

8 Claims, 1 Drawing Sheet

SANITARY WATER VALVE

FIELD OF THE INVENTION

The invention relates to a sanitary water valve with parallel engaging valve disks in a housing, two of the disks being nonrotatable, one of the fixed valve disks being formed with water-inlet openings and the other with deflecting chambers, and a third valve disk being arranged between the two fixed valve disks and being movable relative to them while having water-throughflow passages and recesses for water throughflow.

BACKGROUND OF THE INVENTION

Such a valve is described for example in European patent application 309,445. This type of valve produces considerable noise because of the impingement of water and the formation of the control edges and is therefore only limitedly usable.

It is known from U.S. Pat. No. 3,433,264 to use steps to reduce noise. In order to obtain noise class I (see for example DIN 82218) this procedure is not sufficient in the described type of sanitary valves.

OBJECT OF THE INVENTION

It is therefore an object of the present invention to provide and improved disk-type valve.

SUMMARY OF THE INVENTION

According to the invention a valve has a housing provided with a fixed inlet disk in the housing formed with throughgoing water-inlet ports and a fixed outlet disk transversely spaced in the housing from the inlet disk and formed with deflecting chambers aligned transversely with the inlet ports. A movable valve disk in the housing between the fixed disks is formed with throughgoing passages alignable transversely between the respective inlet ports and deflecting chambers and has a side forming with the housing an outlet recess. Toothed steps are formed on the side of the movable valve disk to reduce noise.

SPECIFIC DESCRIPTION

Figure 1:
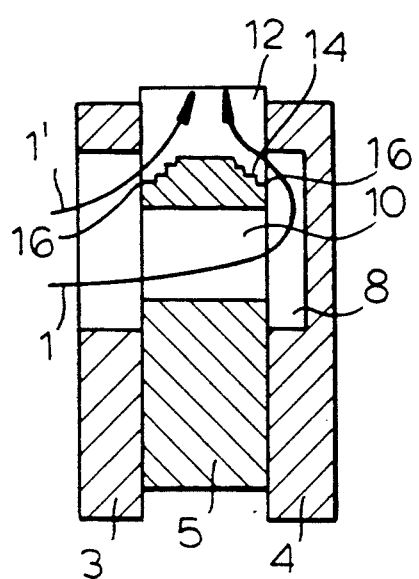
FIG. 1 is a section taken along line I—I of FIG. 2.
Figure 2:
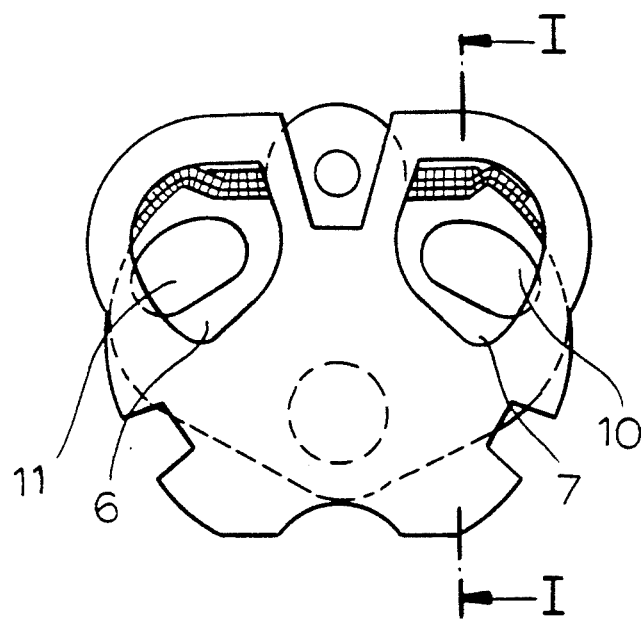
FIG. 2 is a side view of the valve in the open position.
Figure 3:
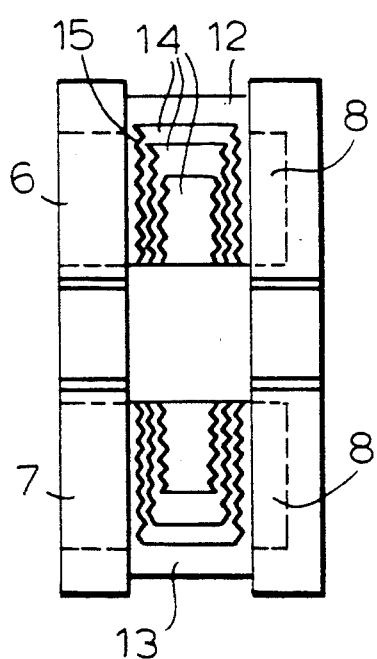
FIG. 3 is a top view of the valve.

A sanitary valve conforming generally to the valve shown in European patent application 309,443 is provided with a pack of seal disks according to FIG. 1, that is two rotationally fixed valve disks 3 and 4 with the valve disk 4 having water-inlet openings 6 and 7 for the intake of cold and hot water. This water flows according to arrow 1 either through a through-flow opening 10 or 11 into a deflecting chamber 8 or 9 and from there into a recess 12 or the water flows directly as shown by arrow 11 from the water inlet opening 6 or 7 into the recesses 12 or 13. The deflecting chambers 8 and 9 are in the second rotationally fixed valve disk 4 and between the valve disks 3 and 4 there is a shiftable valve disk 5 which as described above has water throughflow passages 10 and 11. At one end this movable valve disk 5 delimits these recesses 12 and 13. The part of the movable valve disk 5 delimiting these recesses 12 and 13 is formed with steps 14 which are toothed. This toothing is shown in FIG. 3 at 15. With these toothed steps 14 the control edges 16 remain unchanged and the toothing starts at the first step which extends at a predetermined distance from the control edge. According to flow cross section, amount of sound damping, and available space, one or more steps can be used. In the present case three steps are used, e.g. 0.7 mm high and 0.5 mm from the control edge and also 0.5 mm from step to step. The toothing can be in the shape of 60° or 90° slits and the steps can lie directly in line with one another or can be offset.

Figure 4:
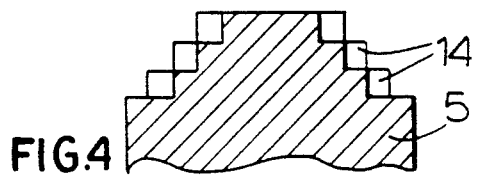
FIG. 4 is a large-scale section taken along line IV—IV of FIG. 5.
Figure 5:
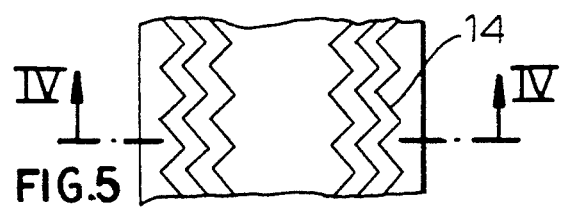
FIG. 5 is a top view of the detail of FIG. 4.
Figure 6:
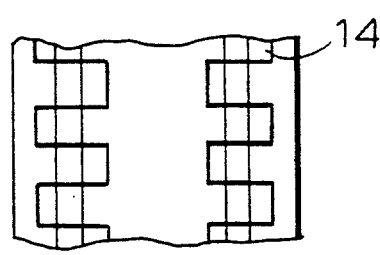
FIGS. 6 and 7 are views like FIG. 5 of variants on the movable valve disk of this invention.
Figure 7:
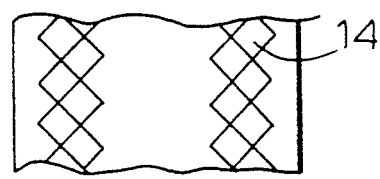

FIG. 4 shows the steps according to FIG. 1 but enlarged and in fact FIG. 4 corresponds to the section along lines IV—IV in the various embodiments according to FIGS. 5, 6, and 7. In FIG. 5 a 90° toothing is provided and the throughgoing steps extend as a zigzag. In FIG. 6 the toothing is formed on individual steps which are offset in their depth to each other and in FIG. 7 the toothing is also formed as individual steps which extend obliquely.

The invention allows a sanitary valve to be made in sound class I without influencing the control geometry or the flow cross section and throughput.

I claim:

1. A valve comprising:
   a housing;
   a fixed inlet disk in the housing formed with throughgoing water-inlet ports;
   a fixed outlet disk transversely spaced in the housing from the inlet disk and formed with deflecting chambers aligned transversely with the inlet ports;
   a movable valve disk in the housing between the fixed disks, formed with throughgoing passages alignable transversely between the respective inlet ports and deflecting chambers, and having a side forming with the housing an outlet recess; and
   toothed steps formed on the side of the movable valve disk.

2. The valve defined in claim 1 wherein the movable disk has sealing surfaces engaging the fixed disks and the steps extend in both directions from the sealing surfaces.

3. The valve defined in claim 2 wherein the surfaces meet each side at a smooth control edge.

4. The valve defined in claim 1 wherein the teeth of the steps are offset from step to step.

5. The valve defined in claim 1 wherein the teeth of the steps are aligned.

6. The valve defined in claim 1 wherein each tooth has a pair of flanks extending at about 90° to each other.

7. The valve defined in claim 1 wherein each tooth has a pair of flanks extending at about 60° to each other.

8. The valve defined in claim 1 wherein the teeth of the steps are separated by slits.

* * * * *